United States Patent [19]

Jenisch, Jr.

[11] Patent Number: 5,289,848

[45] Date of Patent: Mar. 1, 1994

[54] COMBINATION NOISE SUPPRESSOR AND AIR FILTER AND MILKING MACHINE PRESSURE REGULATOR

[75] Inventor: William Jenisch, Jr., Fullerton, Calif.

[73] Assignee: L. J. Engineering, Inc., Huntington Beach, Calif.

[21] Appl. No.: 997,225

[22] Filed: Dec. 28, 1992

[51] Int. Cl.$^5$ ............................................. A01J 5/04
[52] U.S. Cl. ................................. 137/545; 137/549; 137/494; 119/14.44
[58] Field of Search ..................... 119/14.44; 137/549, 137/494, 545

[56] References Cited

U.S. PATENT DOCUMENTS

| | | | |
|---|---|---|---|
| 1,973,258 | 9/1934 | Jensen | 137/549 |
| 2,417,976 | 3/1947 | Franklin | 137/545 |
| 2,720,890 | 10/1955 | Stroud | 137/545 |
| 3,145,731 | 8/1964 | Kaatz et al. | 137/549 |
| 3,262,563 | 7/1966 | Pall | 137/545 |
| 3,811,467 | 5/1974 | Jones | 137/494 |
| 3,938,547 | 2/1976 | Jones | 137/488 |
| 4,273,154 | 6/1981 | Moldenhauer et al. | 119/14.44 |
| 4,335,743 | 6/1982 | Jones | 137/494 |
| 4,955,408 | 9/1990 | Meermoller | 119/14.44 |
| 5,038,815 | 8/1991 | Palmer | 137/545 |

Primary Examiner—A. Michael Chambers
Attorney, Agent, or Firm—Richard L. Gausewitz

[57] ABSTRACT

A combination noise suppressor and air filter fits closely around a pressure regulator for milking machines, in such tight-fitting sealed relationship that little or no air or dirt can enter except through a relatively large diameter washable air filter which can be removed and cleaned even while the milking machine is running. The air passing inwardly through such filter also passes through the bars of a cage which support the filter against collapse. A noise suppressor, formed of a laminate of rigid and soft synthetic resin, is provided, and has apertures therethrough through which air passes downwardly after entering through the air filter. After thus passing downwardly, the air is in a chamber that contains the inlet ports of the pressure regulator portion of the combination, the upper wall of the chamber having convolutions which cooperate with sound-absorbing side and bottom walls of the chamber to absorb sound that is generated when air enters into the regulator. Any sound escaping through the apertures in the suppressor is largely absorbed by a sound-absorbing wall at the upper region of the apparatus.

18 Claims, 3 Drawing Sheets

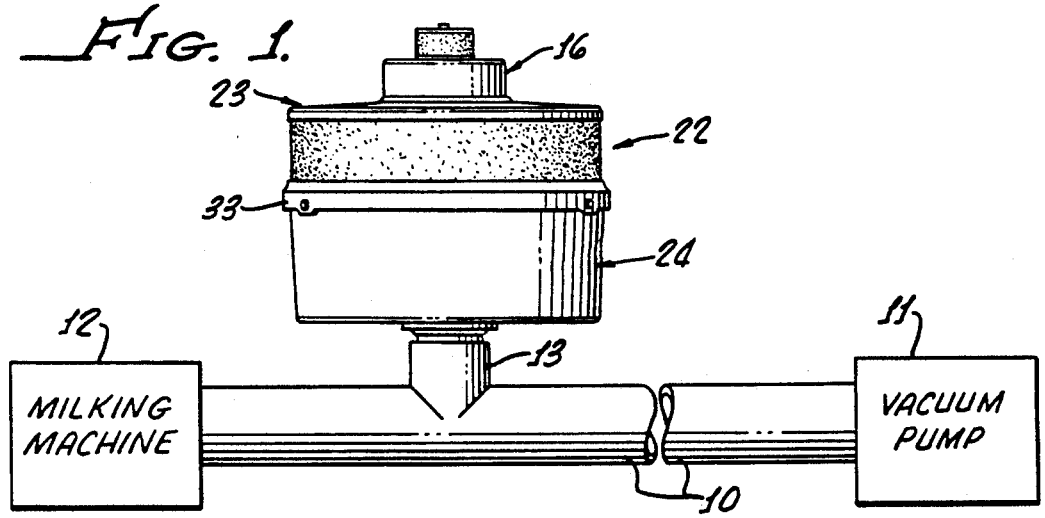
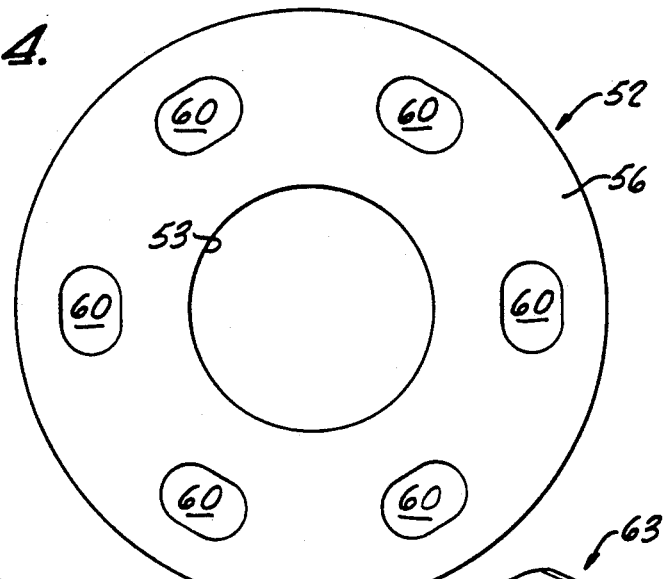
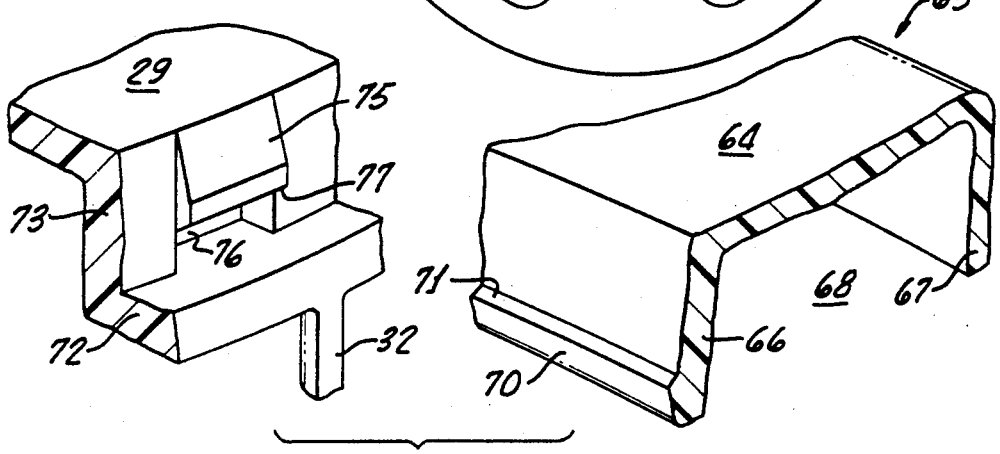

COMBINATION NOISE SUPPRESSOR AND AIR FILTER AND MILKING MACHINE PRESSURE REGULATOR

BACKGROUND OF THE INVENTION

U.S. Pat. Nos. 3,811,467; 3,938,547; and 4,335,743, all described inventions made by Jerry Jones, teach highly successful pressure regulating apparatus for milking machine systems employed in dairies. The purpose of the apparatus described in the patents is to maintain constant the absolute pressure (vacuum) in the milking machines, regardless of the effects of numerous things tending to change the pressure.

Despite the success of the mechanisms described in the cited patents, there remained a distinct problem relative to noise generated by such mechanisms as the air flowed therethrough at considerable velocity and volume. The noise was such that dairymen tended to locate the mechanisms in positions relatively remote from the actual milking machines, so as not to disturb the cows and the persons working with them. Such remote locations of the pressure regulating mechanisms tended to reduce somewhat the degree of effectiveness of the regulation itself, in that the pressure regulators did not sense what was happening at (for example) the sets of teat cups until later. For best regulation, the pressure regulator should be located near the actual milking machines.

Another factor relative to the apparatus described in the cited patents was that air filters for the pressure regulators could not practically be removed, washed and replaced while the milking machines were operating. It is highly desirable to have filters that can be washed while the milking machines are operating. It is further desirable that such filters be large in diameter in order to increase the filter area and thus extend the period that can elapse between washings.

SUMMARY OF THE INVENTION

In accordance with one aspect of the present invention, a housing is mounted sealingly around a pressure regulator for milking machines, the housing being divided by an isolator element into an upper chamber and a lower chamber. The isolator is composed and configured in such manner as to absorb (or suppress) noise. The isolator has spaced openings of predetermined size therethrough, so that air that enters the upper chamber passes downwardly into the lower chamber and thence through port means into the pressure regulator.

In accordance with another aspect of the present invention, the peripheral wall of the upper chamber is shaped as a cage, around which is mounted a filter element for the air passing into the upper chamber. The filter element is held in position by a snap ring which—together with the filter element—may be removed manually at any time without use of tools so as to permit washing of the filter element even when the apparatus is in operation.

In accordance with another aspect of the invention, the side and bottom walls of the lower chamber, and the upper wall of the upper chamber, have noise-absorbing material secured thereto so as to aid in the absorbing of noise that is present in the lower chamber and also in the upper chamber, the latter having escaped through the above-indicated openings in the isolator.

In accordance with another aspect of the invention, the combination noise suppressing and air filtering apparatus is retrofitted onto existing pressure regulators for milking machines, in combination therewith, by employing connecting means already partially present on such existing pressure regulators.

In accordance with another aspect of the invention, the housing is composed of upper and lower elements that are removably secured to each other, and when connected together cause the peripheral region of the isolator to be sandwiched between a portion of the upper housing and the upper surface of a noise absorbing element in the lower housing. The connector portion of the upper housing further operates to seat and seal the lower region of the air filter.

In accordance with another aspect of the invention, the isolator is a laminate of rigid material and soft sound-absorbing material, there being registered holes or openings in the laminate through which air passes downwardly from the upper chamber. The lower surface of the soft sound-absorbing material is convoluted to cooperate in the absorbing of noise.

BRIEF DESCRIPTION OF THE DRAWINGS

FIG. 1 is a view showing the exterior of the combination pressure regulator, noise absorber and air filter for milking machine systems, in combination with such a system;

FIG. 4 is a top plan view of the isolator;

FIG. 5 is an exploded fragmentary detailed view showing regions where the filter-mounting ring snap-connects with the upper housing portion.

DETAILED DESCRIPTION OF THE PREFERRED EMBODIMENT

Figure 3:
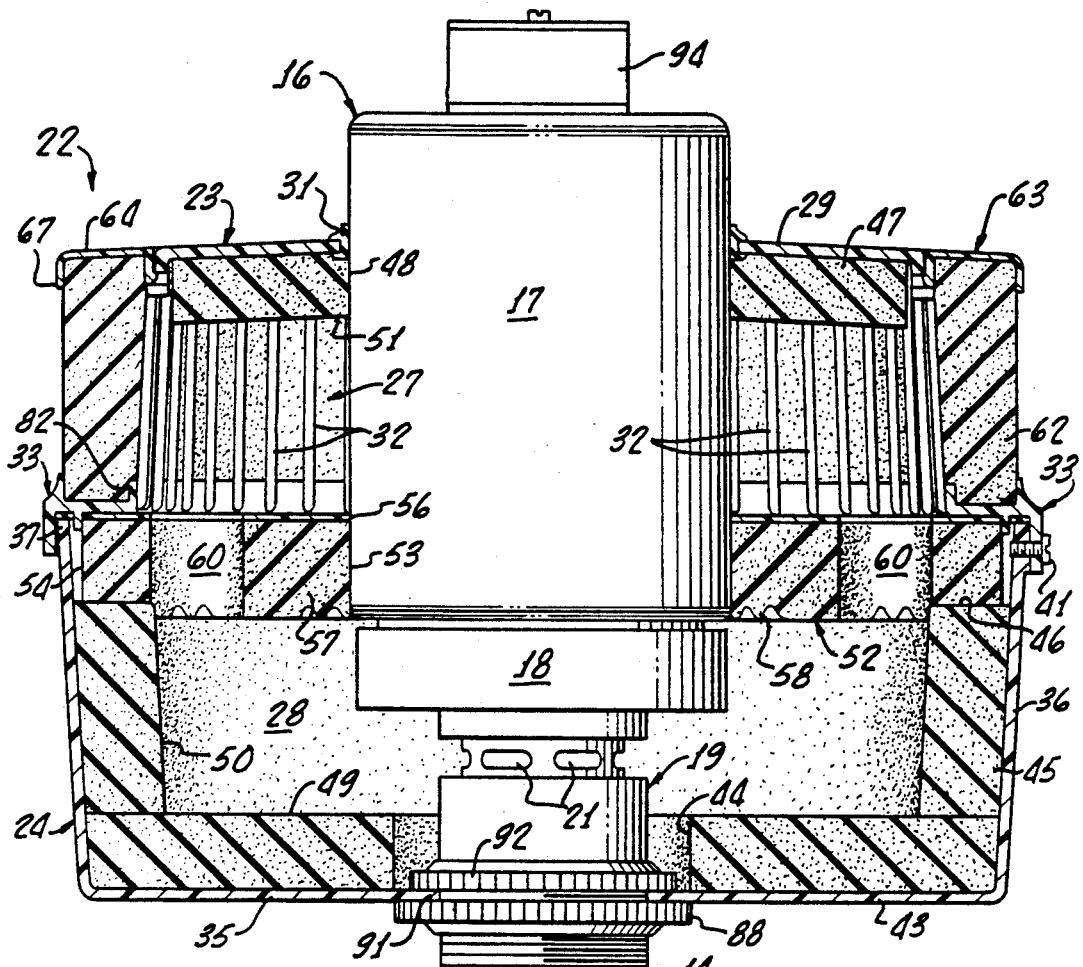
FIG. 3 is a view showing the combination sound absorber and air filter in vertical section, and showing the pressure regulator in side elevation.

Referring to FIGS. 1 and 3, an air pipe 10 is shown as extended between a vacuum pump 11 and a milking machine 12. Extending upwardly from pipe 10, very preferably at a region relatively close to milking machine 12, is a Tee pipe 13 that is internally threaded at its upper end. The exteriorly-threaded lower end 14 of a pressure regulator 16 for the milking machine 12 is threadedly connected with the Tee pipe 13, thus not only providing an air path but also providing physical support for the pressure regulator 16.

The pressure regulator 16 may be of various types and sizes, including the two regulators shown and described in the above-cited patents. Said patents are hereby incorporated by reference herein as though set forth in full. The particular regulator shown in FIG. 3 is highly similar to that of the cited U.S. Pat. Nos. 3,811,467 (which is the same as 3,938,547). It is preferred that no remote sensing line 77 (FIG. 1 of U.S. Pat. No. 3,811,467) be employed, and that instead the plug 81 shown at the bottom-center of FIG. 2 of said patent be removed.

In accordance with one aspect of the present invention, the air filter 29 and associated rings 30 shown in U.S. Pat. No. 3,811,467 are removed. Furthermore, the threaded ring 31 (FIG. 2 of said patent) is employed in cooperation with the dome of the pressure regulator to support the entire noise suppressor and air filter combination, as further described below.

The pressure regulator 16 shown in the present patent application has a vertically elongate and generally cylindrical dome 17 that is connected axially to a cylindrical body 18 disposed therebeneath. (These substantially correspond, respectively, except for size, to the dome 17 and body 25 of the U.S. Pat. No. 3,811,467.) The body 18 of the present pressure regulator 16 has a reduced-diameter lower portion 19 in which are formed a substantial number of circumferentially-spaced ports 21. It is through these ports 21 that ambient air flows inwardly into the pressure regulator 16, the flow being of high velocity and creating a loud noise. This inflowing air enters the pipe 10, under control of valving such as is described in the U.S. Pat. No. 3,811,467, in such manner as to maintain the absolute pressure (vacuum) at milking machine 12 substantially constant.

The Combination Noise Suppressor and Air Filter

The combination noise suppressor and air filter is designated generally by the number 22, in FIGS. 1 and 3. It has a housing formed of an upper portion (component) 23 and a lower portion (component) 24. These are adapted to mate together and to combine with an isolator (described below) to form an upper chamber 27 and lower chamber 28 as indicated in FIG. 3. Upper chamber 27 is an annulus about dome 17, while lower chamber 28 is an annulus about the air inlet openings 21 and associated regions of the body 19 of the pressure regulator. The housing portions 23,24 and associated solid rings may be and are injection molded of suitable synthetic resin.

Figure 2:
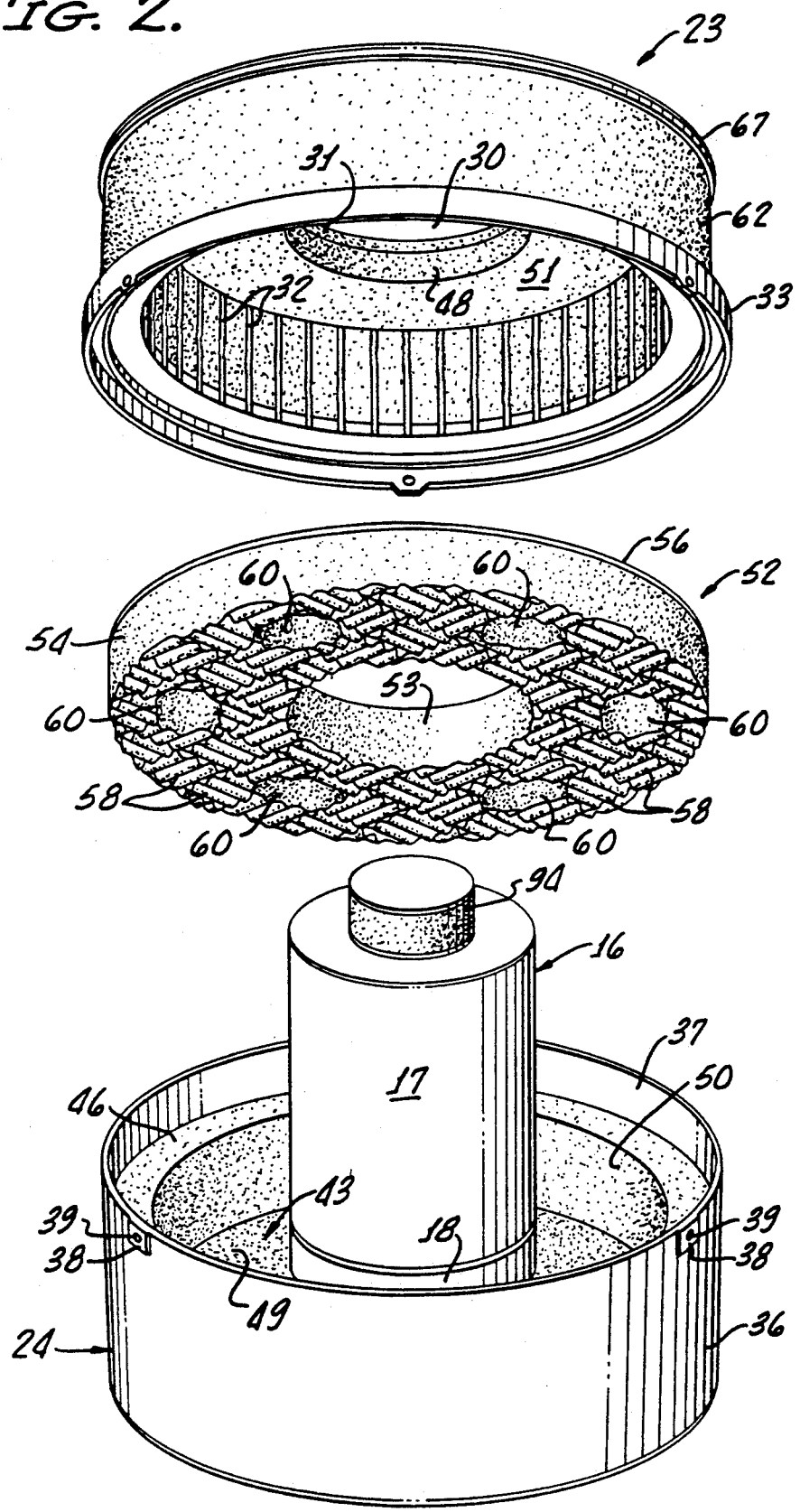
FIG. 2 is a partially exploded view showing the upper housing and associated components as separated from the lower housing and associated components, with the isolator shown therebetween.

Proceeding first to a description of upper housing portion 23, this has a disc-shaped horizontal upper wall 29 (FIG. 3) in which is coaxially molded a circular central opening 30 (FIG. 2). The rim portion of wall 29, that defines opening 30, is slightly larger in diameter than the dome 17. A grommet, annular seal or wiper 31 formed of elastomeric material is mounted on such rim as indicated in FIG. 3, being sealingly engaged with the dome 17.

Upper wall 29 connects, at its periphery, to a downwardly-divergent frustoconical sidewall that consists essentially of circumferentially-spaced "bars" 32 of a cage. The bars 32 are sufficiently small in cross-sectional shape, and spaced sufficiently far apart, to admit large volumes of air into upper chamber 27. Furthermore, the bars 32 prevent sucking-in of the air filter described below.

The cage and filter are large in diameter and therefore present large flow area for the air.

At the lower ends of bars 32, that is to say at the lower region of the frustoconical sidewall of upper housing portion 23, there is formed integrally a radially-outwardly extending mounting, connecting and sealing ring 33. Ring 33 connects the upper and lower housing portions 23,24 sealingly together, and performs other functions, as described below in connection with FIG. 6.

Proceeding next to a description of the lower housing portion 24, this comprises a lower horizontal disc-shaped wall 35, at the center of which is formed a circular opening that is only very slightly larger in diameter than the threaded lower end 14 (FIG. 3) of the body 19. A downwardly-convergent frustoconical sidewall 36 is integral with lower wall 35, the upper edge or rim of wall 36 being a lip 37 as best illustrated in FIG. 2. At three circumferentially-spaced points about lip 37 there are thickened portions 38 having internally-threaded holes 39 for connector screws 41. The internal threads are in metal grommets or bushings that are secured in the holes.

There is adhesively secured to the interior surface of bottom wall 35 a disc 43 of noise-absorbing foam. The outer edge of disc 43 extends clear to the interior surface of wall 36, but the inner edge or wall 44 thereof (FIG. 3) is spaced somewhat outwardly from the lower portion 19 of the regulator body, in order to provide room for mounting elements for the sound suppressing and filtering apparatus 22.

A generally frustoconical ring 45 of noise-absorbing foam is adhesively secured to the interior surface of sidewall 36. Such ring extends clear to the upper surface of disc 43, but does not extend upwardly to rim 37. Instead, the upper edge of ring 45 is a horizontal surface 46 spaced a substantial distance below rim 37.

A disc 47 of noise-absorbing foam is adhesively secured to the interior surface of upper wall 29 of the upper housing portion 23. Such disc, has a circular opening formed centrally thereof so as to form an inner edge 48 that is sealing engaged with dome 17 of regulator 16. The outer edge of disc 47 extends to the periphery of upper wall 29.

Preferably, the interior surfaces of foam elements 43,45 and 47 have inwardly-facing "skin" surfaces 49-51, respectively, which are continuous. Such surfaces are for the purpose of preventing portions of the foam from wearing away as the result of high air flow through the chambers 27,28.

The Sound Isolator Ring

A sound isolator ring 52 (FIGS. 2-4), formed primarily of noise-absorbing foam, is mounted between the upper chamber 27 and the lower chamber 28, to separate the same from each other but with passages or ports therebetween. Stated more definitely, ring 52 is sandwiched at its peripheral region, between the upper surface 46 of ring 45 and the lower surface of the mounting, connecting and sealing ring 33. The isolator has a central opening therein defined by a cylindrical wall 53 which engages the dome 17 in substantial sealing relationship thereto. At its periphery, the isolator 52 has a cylindrical surface 54 that extends close to but spaced inwardly from the lip or rim 37 of lower housing portion 24.

At its upper side, facing upper chamber 27, the isolator 52 is a solid flat ring 56 of substantially rigid synthetic resin. This ring is laminated to the lower noise-absorbing foam 57 as by double-sided pressure-sensitive adhesive. The solid ring 56 prevents downward collapse of the isolator ring in response to high air flow rates.

At its lower side, the foam 57 is grooved or convoluted, for example in the pattern illustrated in FIG. 2, to maximize the sound-deadening effect of the foam 58. Thus, the upper wall of lower chamber 28 is irregular, grooved and convoluted for the purpose of increasing the sound-deadening effects in lower chamber 28.

Port or passage means are provided through the isolator to effect communication between the upper and lower chambers 27,28. These port or passage means are caused to be sufficiently large in combined area that there will be only a low pressure drop between the chambers 27,28. On the other hand, the combined area is caused to be sufficiently small to minimize escape of noise from lower chamber 28 to upper chamber 27—such noise having been created by air flow through ports 21 as previously described.

The port or passage means comprises a plurality of circumferentially spaced ports 60 through the isolator, that is to say through solid ring 56 and foam 57. The ports are so shaped and selected, in the best mode, that at the normal flow rates present in the apparatus the drop in pressure between the upper chamber 27 and lower chamber 28 is about 0.02 inch of water. As an example, and as best shown in FIG. 4, there are six ports 60 spaced equally about the isolator 52 and so located as to be (at their interior walls) adjacent skin 50 of foam ring 45. In the illustration, each port 60 is circumferentially elongate and rounded at its ends, being about 1 and ¾ inch long and 1 and ¼ inch wide.

As an example, each of the foam elements 43,45,47 and 57 is formed of resilient sound absorbing foam. An example is a polyurethane sound absorbing foam made by Illbruck, Inc. of Minneapolis, Minn., and trademarked "SONEX".

The Air Filter Ring, the Mounting Means for the Upper Portion Thereof, and Further Description of Ring 33

Mounted around the frustoconical upper housing cage or "wall" formed by bars 32 is a frustoconical air filter ring 62 formed of air-permeable resilient synthetic foam resin. For example, ring 62 is open-cell polyurethane foam having approximately one hundred pores per inch. It is washable and reusable.

The ring 62 is frustoconical correspondingly to the cage. It fits closely around the bars 32, being prevented by the latter from being sucked into the upper chamber 27.

A ring (mounting ring) 63 is snap-mounted over the upper end of the frustoconical filter ring 62. Ring 63 is formed of synthetic resin and has, as shown in FIGS. 3 and 5, an upper horizontal wall 64 and inner and outer downwardly extending flanges 66 and 67. The flanges 66,67 define a downwardly-opening annular groove 68 that receives the upper edge of air filter ring 62.

A readily manually-operable snap connection is provided between snap ring 63 and upper housing portion 23. As shown in FIG. 5, there is a continuous annular bead 70 provided completely around the lower edge of snap ring flange 66 and facing inwardly, such bead having an upper forty-five degree surface 71. At the intersection between upper wall 29 of upper housing portion 23, and the bars 32, there is a radially-outwardly extending horizontal lip 72 (FIG. 5) the outer edge of which connects to the upper ends of the bars 32. The inner edge of lip 72 connects to a generally cylindrical vertical wall 73 which extends upwardly to the periphery of upper wall 29.

At spaced points about wall 73—for example six equally-spaced points—are provided cam elements 75 that incline downwardly and outwardly at their outer surfaces. Each cam element is identical to each other cam element. Beneath each cam element is a hole 76 such that the lower side of each cam element is a forty-five degree inclined surface adapted to interact with the upper surface 71 of bead 70.

In the operation of the snap ring elements, it is not necessary for the operator to turn the ring 63 to any particular circumferential position because any position will be equally as good as any other position. All the operator need do is snap the ring 63 downwardly, so that bead 70 is expanded by the downwardly-inclined cam elements 75 until the surface 71 snaps past the lower-outer edges 77 of the cam elements 75. Surface 71 then remains beneath the cam elements, with the forty-five degree surfaces engaged, until the ring is manually and intentionally snapped upwardly by the operator. The size of bead 70 is preferably, and in the best mode, so selected that manual upward pressure by the operator will cause surface 71 to snap upwardly past the edges 77, with no need for tools. Furthermore, the size of bead 70 is so selected that it closes and seals holes 76.

Figure 6:
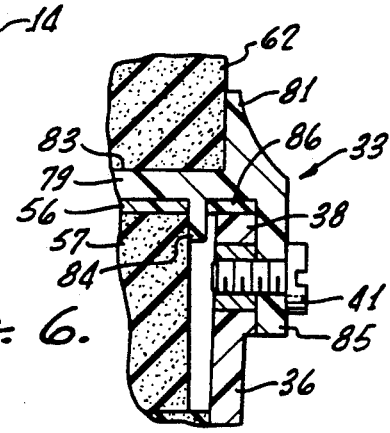
FIG. 6 is an enlarged fragmentary vertical section of regions where the upper and lower housing portions connect.

Proceeding next to a detailed description of ring 33, FIG. 6, which is integral with the lower ends of bars 32, this has a horizontal wall 79 which seats the lower edge of the air filter ring 62. Outer and inner flanges 81,82 (FIGS. 3 and 6), respectively, extend upwardly from wall 79 and define an annular groove 83 that snugly receives the lower edge or end of the air filter.

Inner and outer downwardly-extending flanges 84,85 are provided (as are flanges 81,82) entirely around the horizontal wall 79 (which is also continuous). The inner flange 84 is a centering ring for the isolator 52, in that it locates the outer edge of the solid ring portion 56 of the isolator. This achieves accurate locating of the holes or ports 60. The outer flange 85 is spaced outwardly from inner flange 84 and extends downwardly therefrom for a substantial distance. There is defined between the flanges 84,85 an annular groove that receives an annular sealing element 86 formed of foam. Beneath sealing element 86, the annular groove receives the lip or rim 37 of lower housing portion 24. It also receives, for example at the region indicated in FIG. 6, the thickened portions 38 (FIG. 2) of the lip or rim.

The previously-indicated screws 41 extend inwardly through holes in outer flange 85 and are threaded into the metal-lined threaded holes 39 (FIG. 2) in the thickened portions 38, to securely connect the upper and lower housing portions 23,24 together. The relationships are such that lip 37 presses into the sealing element 86 to create a tight seal when the screws 41 are in place.

Thus, the ring 33 effects mounting of the lower region of the air filter ring 62, effects connection between the upper and lower housing portions of the apparatus, effects sealing at the lip so as to prevent air flow between the housing portions directly from the ambient atmosphere, and effects operating of the isolator 52.

Method of Mounting, Operating and Cleaning

Let it be assumed that a pressure regulator 16 for milking machine systems is already in existence and functioning, being one of many units that have been used for years. Let it also be assumed that, for example, the regulator 16 happens to be the one shown in FIG. 3 of the present patent application, as indicated above. Accordingly, the operator selects the particular size combination noise suppressor and air filter that is adapted to fit the pressure regulator 16, this being (in this instance) the one shown in the present drawings.

The operator then stops operation of the vacuum pump 11 (FIG. 1) and disconnects the threaded end 14 (FIG. 3) from Tee pipe 13 (FIG. 1). The operator then removes the pressure regulator 16 and separates from it (and discards) the air filter ring already present.

At this time, the lower and upper housing portions 24 and 23 are not connected to each other. The threaded end 14 already has an upper ring 92 thereon, which corresponds generally to the ring 31 shown in FIG. 2 of U.S. Pat. No. 3,811,467. This ring 92 is threaded by the operator upwardly, tightly, to the upper end of the threads on end 14.

As the next step, the threaded end 14 is inserted through the central opening in the lower housing portion. Because of the close fit at 14-91, the lower housing is then coaxial with the regulator elements 17-19. A lower mounting ring 88 is then threaded onto the threaded lower end 14, and is tightened upwardly so as to clamp the bottom wall of the lower housing between the upper ring 92 and the lower ring 88.

Isolator 52 is then mounted over dome 17, and is centered by flange 84 (FIG. 6) and by the dome.

As the next step, the upper housing 23 and associated components is telescoped downwardly over dome 17 until the lip or rim 37 mates with the annular groove between flanges 84,85 (FIG. 6), with the lip seating against the foam seal 86 as described above. Such telescoping is continued until the screws 41 can be and are inserted through their respective holes to connect everything together. The isolator 52 is thus accurately positioned and held between the upper and lower housing elements, in proper position.

The seal 31 has an inner-upper edge which is shaped (when not distorted) as the edge of a windshield wiper blade. This edge is bent upwardly as shown in FIG. 3 and wipes against the exterior surface of dome 17. A very effective air seal is thus achieved.

Threaded end is then threaded into pipe 13, FIG. 1, to complete the operation.

The vacuum pump 11 is then started, following which the pressure regulator 16 performs its function of maintaining constant the pressure (vacuum) in the milking machine 12. Air flows inwardly at high volume, such as hundreds of cubic feet per minute, through the large-diameter air filter 62 and into upper chamber 27. Despite the high flow, bars 32 prevent the foam element 62 from being drawn inwardly.

After entering upper chamber 27, the air passes downwardly through ports 62 into chamber 28 and thence through ports 21 into the pressure regulator 16 and into the pipe 10 (FIG. 1).

This, as described above, creates loud noise, and this noise is deadened by the convolute bottom wall 58 of isolator 52, by the foam of such isolator and also of elements 43 and 45. Noise which escapes upwardly through ports 60 is deadened by the upper foam element 47. In these ways, the audible sound heard by the operator and by the cows is greatly reduced, from about ninety decibels to about seventy-eight decibels in a typical unit.

When it is desired to wash the air filter, the vacuum pump 11 need not be shut off, so the operator can clean the filter at any time even when milking is occurring. All that is necessary to do is to snap the snap ring 63 upwardly as described relative to FIG. 5, lift off the soft foam filter ring 62, wash such filter ring, put it back in position and snap on the snap ring 63. There are markings, not shown, on the exterior surface of the filter ring to indicate which side is up, in that the ring is frustoconical and not cylindrical.

At infrequent intervals, the screws 41 may be removed and the upper housing element 23 separated from lower housing elements. Thereafter, the isolator 52 is removed and all of the chambers are inspected for dust. If any dust is present despite the highly effective seals, it is readily wiped off of the skin surfaces 49,50 and 51. The apparatus is then reassembled, all of this occurring without the necessity of separating the lower housing element 24 from the threaded element 14.

Because the present noise suppressor mounts around at least a large part of air dome 17, noise present in such dome is substantially attenuated before reaching the operator. In one embodiment, not shown, the upper housing portion extends above and over the entire dome 17. There is only a small center hole in the upper wall 29, through which an air filter 94 (associated with the pressure controlling valve 18 of U.S. Pat. No. 3,811,467) snugly extends.

The foregoing detailed description is to be clearly understood as given by way of illustration and example only, the spirit and scope of this invention being limited solely by the appended claims.

What is claimed is:

1. A combination noise suppressor, air filter, and pressure regulator for milking machine systems, which comprises:
    a pressure regulator for milking machine systems,
        said pressure regulator comprising an air dome, a body connected to said air dome, and valve and port means in said body to admit air into said pressure regulator in order to maintain substantially constant the pressure in the associated milking machine,
    a combination air filter and noise suppressor,
        said combination air filter and noise suppressor comprising a housing mounted around at least a large portion of said air dome and communicating with said valve and port means,
        said housing having an opening therein that receives said air dome, said opening being defined by an edge near said air dome,
    said combination air filter and noise suppressor further comprising inlet-opening means into said housing and an air filter to filter ambient air that enters said housing through said inlet-opening means and thereafter enters said pressure regulator through said valve and port means,
    said combination air filter and noise suppressor further comprises noise absorbing and deadening means mounted in said housing to suppress noise generated at said valve and port means as said air enters therethrough into said pressure regulator.

2. The invention as claimed in claim 1, in which sealing means are provided on said edge to make an air seal between said edge and said air dome.

3. A combination air filter, noise suppressor, and pressure regulator for milking machine systems, comprising:
    a pressure regulator for milking machine systems,
        said pressure regulator having a dome and having a body beneath said dome,
            said body having air-inlet means therein for admitting air into said pressure regulator,
            said body being connected to a pipe that connects to a milking machine system,
    a housing having an upper portion,
        said upper portion of said housing being mounted around at least a large portion of said dome,
    said housing also having a lower portion,
        said lower portion of said housing being mounted around said body,
    means in said housing to suppress the noise generated at said air-inlet means when air enters therein from said lower portion, circumferentially-oriented port means in said housing to admit ambient air into said housing, an air filter ring mounted on said housing, over said port means, to filter the ambient air entering said housing, and means on said housing to mount said air filter ring thereon.

4. The invention as claimed in claim 3, in which said last-named means includes a ring mounted onto said housing, said ring being removable to permit removal and replacement of said air filter ring whether or not said milking machine system is operating.

5. The invention as claimed in claim 4, in which snap means are provided to removably snap-mount said ring onto said upper portion of said housing.

6. The invention as claimed in claim 3, in which said upper and lower housing portions are separate elements adapted to mate together, and in which means are provided to sealingly connect said upper and lower housing portions to each other.

7. The invention as claimed in claim 3, in which said noise suppressor means includes an isolator ring mounted around said dome intermediate said upper and lower housing portions, said isolator ring having port means therein through which air is transmitted from said upper portion to said lower portion.

8. The invention as claimed in claim 7, in which the lower side of said isolator is convoluted, and in which said isolator is braced to prevent it from being sucked into said lower portion.

9. The invention as claimed in claim 7, in which sound absorbing foam is mounted interiorly on bottom and sidewalls of said lower portion, and on an upper wall of said upper portion.

10. The invention as claimed in claim 7, in which sound absorbing foam is mounted interiorly on bottom and sidewalls of said lower portion and an upper wall of said upper portion, and in which the peripheral portion of said isolator is sandwiched between a wall of said additional foam on the sidewall of said lower housing portion, and a region of said upper portion.

11. The invention as claimed in claim 3, in which said upper and lower portions are separate frustoconical elements connected together at a flange on said upper portion, there being a seal therebetween, and in which said noise suppressor includes a noise isolator formed primarily of noise-suppressing foam and secured and centered at least partially by said flange.

12. A combination noise suppressor and pressure regulator for milking machine systems, comprising:

a pressure regulator for milking machine systems,
said pressure regulator having a dome and having a body beneath said dome,
said body having air-inlet means therein,
said body being connected to a pipe that connects to a milking machine system, a housing having an upper portion,
said upper portion of said housing being mounted sealingly around at least a large portion of said dome,
said housing having a lower portion,
said lower portion of said housing being mounted sealingly around said body, means in said housing to suppress the noise generated at said air-inlet means when air enters therein from said lower portion, and circumferentially-spaced port means in said housing to admit ambient air into said housing.

13. The invention as claimed in claim 12, in which said upper and lower housing portions are separate elements adapted to mate together, and in which means are provided to sealingly connect said upper and lower housing portions to each other.

14. The invention as claimed in claim 12, in which said noise suppressor means includes an isolator ring mounted around said dome intermediate said upper and lower housing portions, said isolator ring being formed primarily of noise absorbing foam, said isolator ring having openings therein through which air is transmitted from said upper portion to said lower portion.

15. The invention as claimed in claim 14, in which the lower side of said isolator is convoluted, and in which the upper side of said isolator is braced to prevent said foam from being sucked into said lower portion.

16. The invention as claimed in claim 14, in which additional sound absorbing foam is mounted interiorly on bottom and sidewalls of said lower portion and an upper wall of said upper portion.

17. The invention as claimed in claim 14, in which additional sound absorbing foam is mounted interiorly on walls of said lower portion, and in which the peripheral portion of said isolator is sandwiched between a wall of said additional foam on the sidewall of said lower portion, and a region of said upper portion.

18. The invention as claimed in claim 12, in which said lower portion is apertured to fit around the lower portion of said regulator body, and in which means are provided to clamp said lower housing portion to said lower portion of said regulator body.

* * * * *